(12) United States Patent  (10) Patent No.: US 8,131,395 B2
Johnson et al.  (45) Date of Patent: Mar. 6, 2012

(54) 90 DEGREE PLY PLACEMENT SYSTEM AND METHOD

(75) Inventors: David W. Johnson, San Diego, CA (US); Scott A. Garrett, San Diego, CA (US); Stephen C. Moyers, Jamul, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 1182 days.

(21) Appl. No.: 11/870,062

(22) Filed: Oct. 10, 2007

(65) Prior Publication Data

US 2008/0091293 A1  Apr. 17, 2008

Related U.S. Application Data

(60) Provisional application No. 60/852,052, filed on Oct. 16, 2006.

(51) Int. Cl.
*G06F 19/00* (2011.01)
(52) U.S. Cl. ............... 700/130; 66/84 A; 28/102
(58) Field of Classification Search ............ 700/130, 700/142; 66/84 R, 84 A; 19/296, 299, 302; 28/102
See application file for complete search history.

(56) References Cited

U.S. PATENT DOCUMENTS

| | | | | |
|---|---|---|---|---|
| 3,519,509 A * | 7/1970 | Gidge et al. | .................. | 156/181 |
| 3,761,345 A * | 9/1973 | Smith | .............. | 12/415 |
| 4,395,888 A * | 8/1983 | Wilkens | ........................ | 66/84 A |
| 4,518,640 A * | 5/1985 | Wilkens | ........................ | 428/102 |
| 4,556,440 A * | 12/1985 | Krueger | .......................... | 156/181 |
| 4,682,480 A * | 7/1987 | Schnegg | ........................ | 66/192 |
| 4,703,631 A * | 11/1987 | Naumann et al. | .............. | 66/84 A |
| 4,841,749 A * | 6/1989 | Petracek et al. | ................. | 66/190 |
| 4,872,323 A * | 10/1989 | Wunner | .......................... | 66/84 A |
| 5,055,242 A * | 10/1991 | Vane | .......................... | 264/463 |
| 5,111,672 A * | 5/1992 | Gille et al. | ..................... | 66/84 A |
| 5,445,693 A * | 8/1995 | Vane | ................................ | 156/93 |
| 5,945,356 A * | 8/1999 | Pott | .................................. | 442/57 |
| 5,965,262 A * | 10/1999 | Whisler et al. | ................. | 428/373 |
| 7,120,976 B2 * | 10/2006 | Pester et al. | ..................... | 28/102 |
| 7,196,025 B2 * | 3/2007 | Sahlin et al. | .................. | 442/246 |
| 7,226,518 B2 * | 6/2007 | Loubinoux | ..................... | 156/148 |
| 2004/0082244 A1* | 4/2004 | Loubinoux | .................... | 442/181 |
| 2006/0121805 A1* | 6/2006 | Krulic | ................................ | 442/20 |
| 2008/0091293 A1* | 4/2008 | Johnson et al. | ............... | 700/130 |

* cited by examiner

*Primary Examiner* — Danny Worrell
(74) *Attorney, Agent, or Firm* — Stephen C. Beuerle; Procopio Cory Hargreaves & Savitch LLP

(57) ABSTRACT

A method of placing a 90 degree ply on a separate 0 degree material includes providing 90 degree ply from a 90 degree ply material source; moving the 90 degree ply in a 90 degree ply carrier to a position over the 0 degree material; removing the 90 degree ply carrier from the 0 degree material and simultaneously pushing the 90 degree ply off of the 90 degree ply carrier and onto the 0 degree material; and severing the 90 degree ply from the 90 degree ply material source so that the 90 degree ply remains on the 0 degree material.

14 Claims, 3 Drawing Sheets

90 DEGREE PLY PLACEMENT SYSTEM AND METHOD

CROSS-REFERENCE TO RELATED APPLICATION

This application claims the benefit of provisional patent application 60/852,052, filed Oct. 16, 2006 under 35 U.S.C. 119(e). This provisional patent application is incorporated by reference herein as though set forth in full.

FIELD OF THE INVENTION

The present invention relates generally 90-degree ply placement systems and methods in the composite and textile industry.

BACKGROUND OF THE INVENTION

There is a need for a material, known as a ply, fabric, or the like in the composites industry, but may also be known generally as a fabric in the textile industry, to be dispensed in a precise and automatic fashion to a known location, and then cut or severed, and then have the process automatically repeated for another location. If a belt process or other moving process is moving a second material say under the aforementioned process, these highest-diameter-severed material sections could be deposited precisely on top of the aforementioned moving second material. Or there could be other reasons for this dispensing system.

The reasons could be many. Perhaps rolls of material (fabric, composite plies, carbon fiber fabric, aramid fabric, glass fabric, thermoplastic fabric, some with a resin matrix and some without, or material fabric, nylon, synthetic, or cotton fabric, and the like) already having been formed into a roll, (as has been done for decades in the textile, composites, and fabric production industries using many techniques such as weaving, knitting, stitching, with textile machinery, looms, and the like) are needed to become the essential material in a secondary process. By this it is meant that a roll of material of any type, as generally described in this paragraph, may exist, but, this roll of material, along with perhaps others, requires further processing before a product exists. In other words, the rolls of material are essentially a raw material for an end-product manufacturer. Or the new product may be just another enhanced multi-layer fabric, on a new roll, and available for further processing. That is, the roll itself could be a product, but it also could be processed, along with other rolls, to form future products or rolls of material.

For example, a composite product may need to be processed by dispensing material/fabric from a roll, cutting it, and placing it in a mold. This is usually accomplished by hand with human labor. A composite mold, or hand lay-up, or other composite processing techniques such as Scrimp and Vartm, may all require dispensing of a fabric by hand from a roll of material to a mold, or it is cut, then dispensed by hand to a mold. The present invention could assist with the dispensing of this material to a mold, automatically and with no human intervention.

Or, in the composites industry, for example, fabric can be made in a roll and in its most basic form is known as uni-directional fabric. Multiple rovings or bundles of fibers, of carbon, or aramid, or glass, or PE thermoplastic, or the like, can be placed side-by-side and pulled through a process to stitch together the fibers, or could be combined together with a thermoplastic material. These processing techniques are well-known and in the public domain. The direction of this uni-directional fabric is referred herein as the 0-degree direction and is also known as the warp direction in the textile industry. This 0-degree material is processed and most commonly stored on a roll, thus creating a roll of material known as uni-directional fabric or tape or 0-degree fabric. The composites industry knows that a uni-directional tape or fabric has limited value. Therefore, there is a need, due to requirements for improved physical properties of a composite, to produce a tape or fabric that has reinforcing fibers oriented in the 0-degree direction, and also the orthogonal or 90-degree direction. Additional property values are achieved by adding +/−45-degrees direction. In the past, fabric is either stitched (90-degree to 0-degree) or it is woven (0-degree (warp) interwoven with 90-degree (weft)) or it is cut by hand and placed over other fabric material at any orientation.

Now a new generation of fabrics has arrived wherein the 0-degree fabric (say glass fiber and then plastic) can be formed in a roll or tape by heating, consolidating the two materials. Forming a 0-degree material with a 90-degree material, with the latter being placed on the surface of the former, requires a human being to cut material from a roll, and then place it at 90-degree orientation onto the 0-degree roll and then reheat and consolidate. The end result is a 0-degree plus 90-degree fabric, which is of high need, and can be placed on a roll; however, this is currently accomplished non-automatically. Therefore there is a need as described herein to place a 90-degree ply over a moving 0-degree/90-degree ply fabric.

SUMMARY OF THE INVENTION

The abstract of this process and the machine associated therewith, is the instant invention which is a new and improved process, that is automated and designed to place an exact quantity of material that is preferably on a roll, and is a material that could generically be described as a fabric or preform, or tape, or roll of material, generally thin in nature but not necessarily so, which, according to the description of embodiment herein is dispensed in a new and improved manner. This manner differentiates from the art in which for decades, material has been "taken" off a roll by free-spooling the spool, or the like, and pulling on the end (the end being defined as the severed end on a roll of material that is at the highest diameter and extends from one end of a roll, independent of width, to the opposite end of the roll, herein called the highest-diameter-severed end) of the material until the correct quantity is pulled off the roll, then cutting the parent material from the roll, creating a new highest-diameter-severed end, and then repeating the process by connecting, or grabbing, or securing or pinching, or otherwise attaching to the "new" highest-diameter-severed end of the roll of material, thus preparing for a repeat cycle of the aforementioned steps.

Unlike the art that is described above, the instant invention does not have to connect to the highest diameter-severed-end of the roll of material. The process and machine robotically feeds the material to a designated location through a tube carrier, then removes the tube carrier while feeding forward the material, said material remaining stationary in 3-dimensional space, then cuts the material at a computer controlled designation, then feeds the material to a new location, all with use of motion controlled motors, bearings/ball screws, linear motors and magnet ways, and computer numerical controlled (CNC) processing and all without grabbing or connecting to the highest-diameter-severed end of the roll of material.

It will be obvious to anyone skilled in the art that this is a new and useful processing system for the automation and dispensing of fabric-like materials from rolls for secondary factory-automated processing. In the preferred embodiment, the process is used to dispense 90-degree ply material onto a moving 0-degree composite tape or ply.

Figure 1:
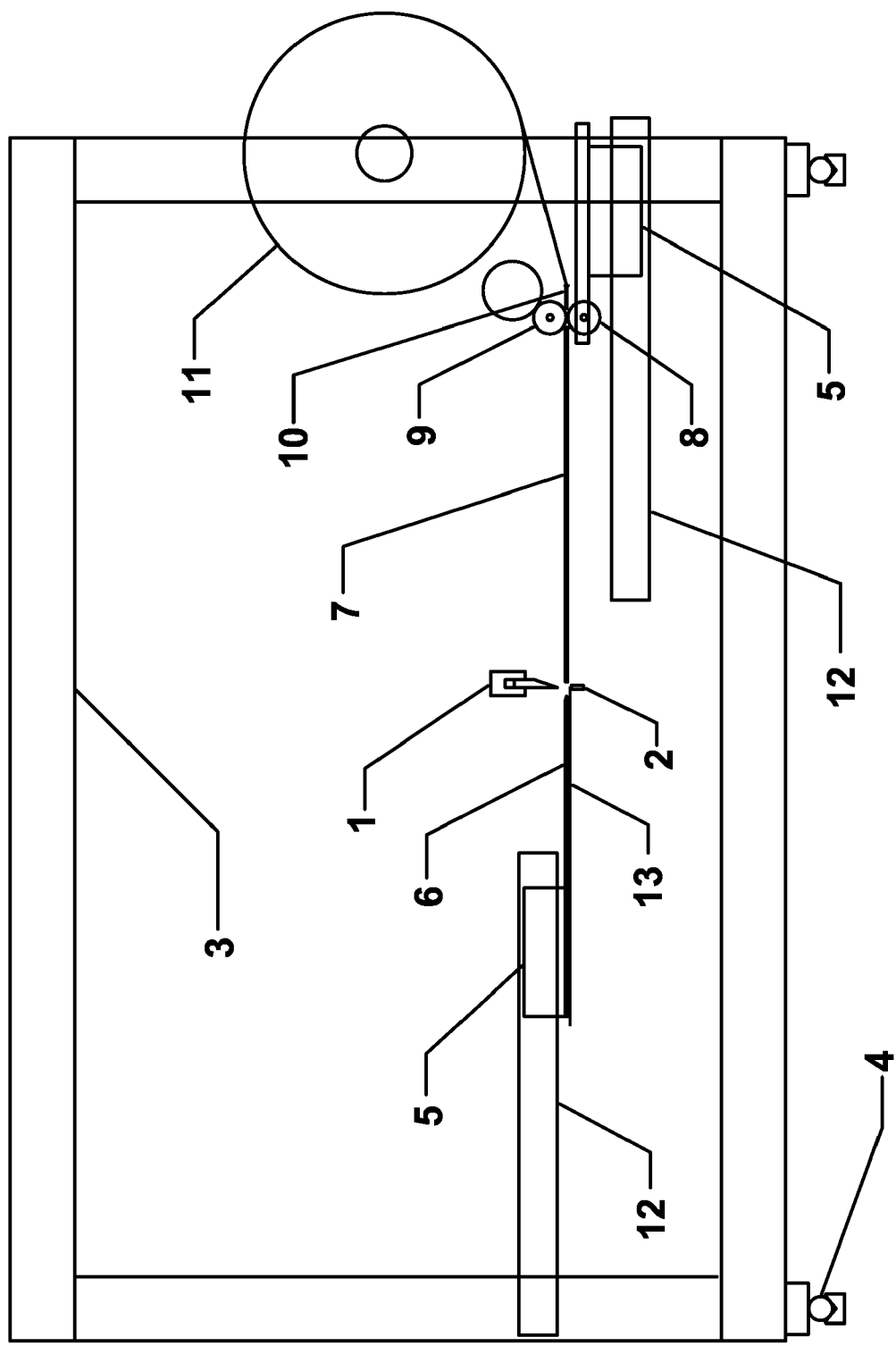
FIG. 1 shows a diagrammatic sketch of the proposed machine.

REFERENCE NUMERALS IN DRAWINGS 1 knife
2 backing
3 gantry frame-moves in x-direction
4 linear bearings for gantry
5 linear motor to carry PAP and tube
6 PAP-needed to support end of tube
7 tube-carries thermoplastic sheet, interior is rectangle, mates with PAP to be guided through knife slot
8 plunger-secures material against fiber feed roller
9 fiber feed roller and motor
10 small guide tube
11 roll of 90 degree material
12 linear motor magnet way and linear bearings
13 0 degree material to which 90 degree material gets applied

DETAILED DESCRIPTION OF EMBODIMENT OF INVENTION

Figure 2:
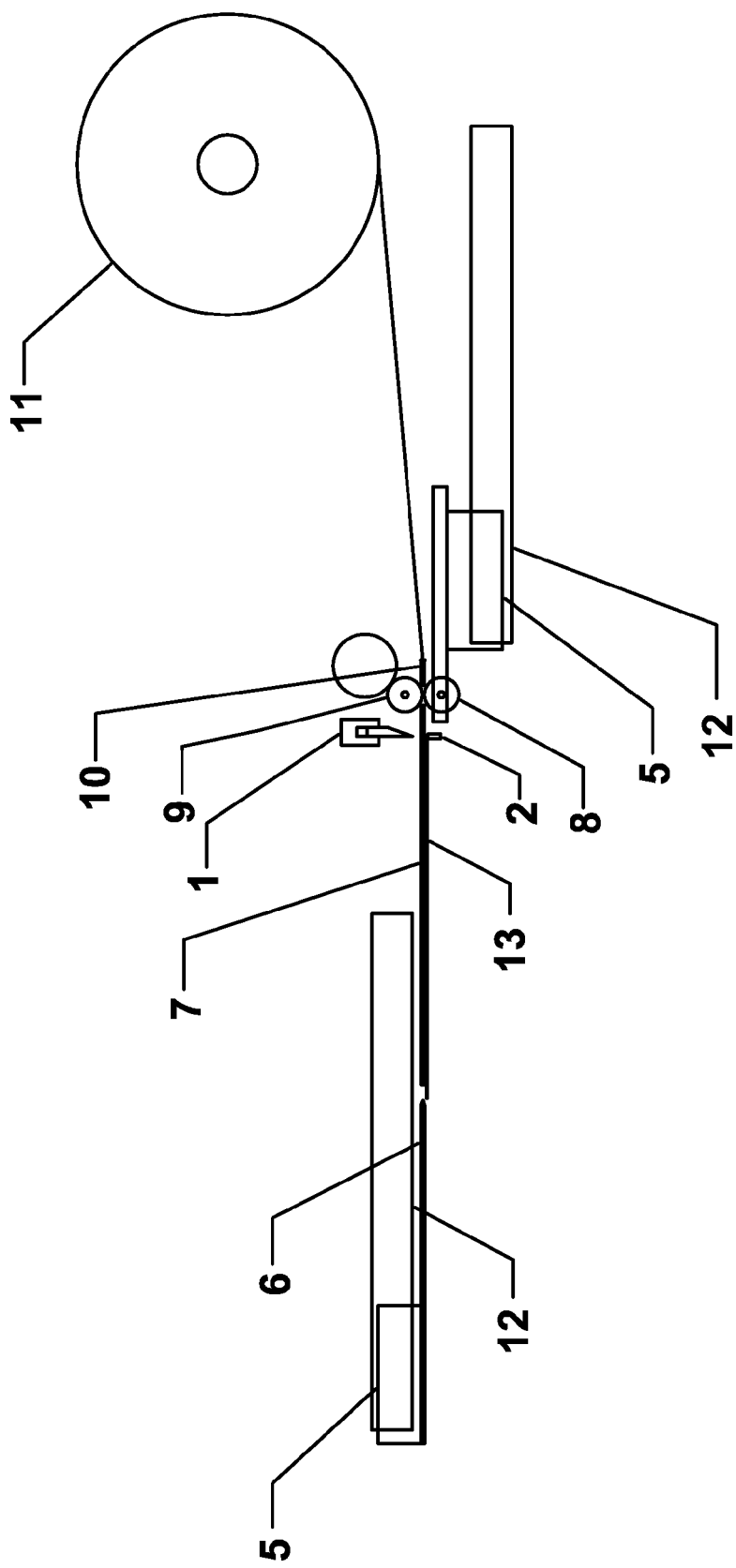
FIG. 2 shows a sketch of the process just after the start of a "90-degree ply placement cycle".
Figure 3:
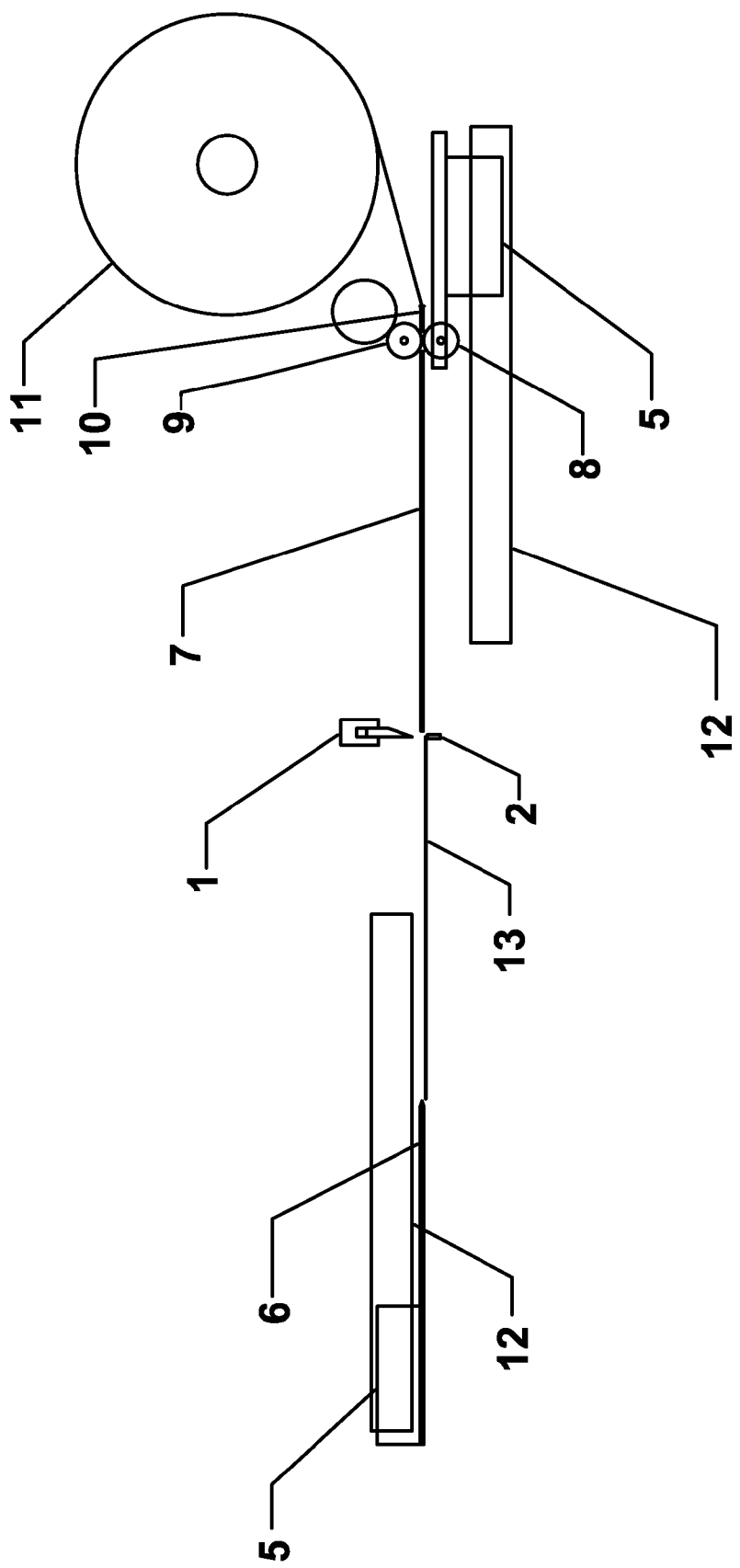
FIG. 3 shows a sketch at the end of a placement cycle.

With reference to FIGS. 1-3 an embodiment of a 90 degree ply placement system and method will be described. In a preferred embodiment, the 90 degree ply placement system is implemented using a six-axis motion controlled computer numerical controlled (CNC) processing system, as shown.

With reference to FIG. 1, item 3 is a gantry, which moves in the x-direction or 0-degree direction. This direction is into and out of the paper, defined as the 0-degree direction. The goal would be to have the gantry driven by a motion control system that would be synchronous with the movement of the 0-degree material, shown in FIG. 1 as 13, on its belt system. If an accurate speed signal cannot be extracted from the belt drive system, an encoder system would be provided to measure this input. The gantry moves on linear bearings, 4, attached on a lower frame (not shown). The access to the entire envelope, above, below, left and right of the 0-degree plies is required to affect the incorporation of this process and integrate it into a process line.

The cycle works as follows: The 90-degree material, shown as 11, is assumed to be a roll of 0-degree material that has already been formed and consolidated and mounted on the gantry frame, 3. It is mounted on the gantry frame at 90 degrees to the flow of the 0-degree material (right to left). The 90-degree material is fed through a small inlet guide tube, 10, and then through a spring-loaded plunger, 8, and fiber-feed roller, 9, and then through the center of a tube carrier, 7. The process will become more apparent as the details are explained below.

The 0-degree material is shown as 13, and moves out of the paper, through the center of the gantry. Just above the 0-degree material is the PAP (Pathway Assistance Probe) support, 6, which can move left-to-right on a set of linear bearings using a linear motor and magnet way, 12 and 5. Since the tube carrier, 7, mentioned in the previous paragraph is attached to its own set of linear bearings and linear motor/magnet way, then the two can be programmed to move in unison. Between the two is a cut-off knife, 1, which can cut the 90-degree material at the appropriate time and at the edge of the 0-degree material.

The cycle has the PAP or Pathway Assistance Probe meeting at the end of the tube carrier and supporting the same. The two move in union to the left in FIG. 1 until the tube carrier, 7, is generally at the far (left-side as shown in FIG. 1) end of the 0-degree material. The PAP, 6, moves away to the left side of the gantry and the tube carrier, 7, withdraws to the right side of the gantry. While withdrawing, the 90-degree material is fed forward at the exact-same-speed as tube withdrawal, which places the 90-degree material correctly on top of the 0-degree material. The material is cut, the gantry moved to a new 0-degree direction-location, and the process is repeated. If a "welding-tack" is required to secure the 90-degree ply to the 0-degree ply, this can easily be added.

The six axes of motion control include the fiber-feed motor, the two linear motors, the cutter actuator, the gantry motion control motor and the 90-degree roll pay-out. All six must be programmed in close synchronization to achieve the desired results.

This system has the advantage of providing automated operations on very large material rolls. For example, if 90-degree material is needed across 12-foot wide rolls (144 inches) this process and machine could be scaled-up to provide this.

The process is unique. The fabric does not have to be rigid. It is generally not understood that a semi-rigid or non-rigid fabric can be "pushed" versus "pulled" off a roll. However, with the invention of the tube carrier in combination with rollers and the spring-loaded plunger, a very accurate fabric "pushing" machine can be made.

The uses for this machine and process extend to many industries. The instant invention describes only one of these uses, but many more will become apparent to those skilled in the art.

The above description of the disclosed embodiment is provided to enable any person skilled in the art to make or use the invention. Various modifications to this embodiment will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method of placing a 90 degree ply on a separate 0 degree material, comprising:
   providing a 90 degree ply from a 90 degree ply material source;
   moving the 90 degree ply in a 90 degree ply carrier to a position over the 0 degree material, the ply carrier being a carrier tube that cooperates with a pathway assistance probe (PAP) to move the 90 degree ply in position over the 0 degree material;
   removing the 90 degree ply carrier from the 0 degree material and simultaneously pushing the 90 degree ply off of the 90 degree ply carrier and onto the 0 degree material;

severing the 90 degree ply from the 90 degree ply material source so that the 90 degree ply remains on the 0 degree material.

2. The method of claim 1, wherein moving the 90 degree ply occurs in a direction perpendicular to a direction of travel of the 0 degree material.

3. The method of claim 1, wherein the ply carrier is removed at the same rate that the 90 degree ply is pushed onto the 0 degree material.

4. The method of claim 1, wherein pushing includes pushing the 90 degree ply with a fiber feed roller.

5. The method of claim 1, wherein the method is performed with a six-axis motion controlled computer numerical controlled (CNC) processing system.

6. The method of claim 5, wherein the six-axis motion controlled computer numerical controlled (CNC) processing system includes a fiber-feed motor, two linear motors, a cutter actuator, a gantry motion control motor, and a 90-degree roll pay-out that provide six axes of motion control.

7. The method of claim 1, further including adding a +45 degree material and a −45 degree material to the 0 degree material and the 90 degree ply.

8. A method of placing a 90 degree ply on a separate 0 degree material, comprising:
providing a 90 degree ply from a 90 degree ply material source;
moving the 90 degree ply in a 90 degree ply carrier to a position over the 0 degree material;
removing the 90 degree ply carrier from the 0 degree material and simultaneously pushing the 90 degree ply off of the 90 degree ply carrier and onto the 0 degree material;
severing the 90 degree ply from the 90 degree ply material source so that the 90 degree ply remains on the 0 degree material,
wherein the method is performed with a six-axis motion controlled computer numerical controlled (CNC) processing system.

9. The method of claim 8, wherein moving the 90 degree ply occurs in a direction perpendicular to a direction of travel of the 0 degree material.

10. The method of claim 8, wherein the ply carrier is a carrier tube that cooperates with a pathway assistance probe (PAP) to move the 90 degree ply in position over the 0 degree material.

11. The method of claim 8, wherein the ply carrier is removed at the same rate that the 90 degree ply is pushed onto the 0 degree material.

12. The method of claim 8, wherein pushing includes pushing the 90 degree ply with a fiber feed roller.

13. The method of claim 8, wherein the six-axis motion controlled computer numerical controlled (CNC) processing system includes a fiber-feed motor, two linear motors, a cutter actuator, a gantry motion control motor, and a 90-degree roll pay-out that provide six axes of motion control.

14. The method of claim 8, further including adding a +45 degree material and a −45 degree material to the 0 degree material and the 90 degree ply.

\* \* \* \* \*